United States Patent Office 3,426,229
Patented Feb. 4, 1969

3,426,229
ROTORS FOR DYNAMOELECTRIC MACHINES
Dennis Alexander Pannell, London, England, assignor to Rotax Limited, London, England
Filed June 3, 1965, Ser. No. 461,083
Claims priority, application Great Britain, June 12, 1964, 24,441/64
U.S. Cl. 310—265  2 Claims
Int. Cl. H02k 1/30

ABSTRACT OF THE DISCLOSURE

A rotor for a brushless alternator, the rotor comprising a cylindrical field tube formed from magnetizable material and having formed in its periphery a plurality of equi-angularly spaced apertures. There being provided within the field tube, a spider having a boss from which extends a plurality of legs equal in number to the number of apertures the legs terminating in pole heads which are situated respectively within the aforesaid apertures. The field tube and spider are secured together by a plurality of two part distance pieces which extend in a generally radial direction intermediate the legs respectively of the spider, the co-operating surfaces of the tube, the distance pieces and the boss being electron beam welded to define a unitary structure.

---

This invention relates to rotors for dynamoelectric machines and of the kind comprising a cylindrical field tube formed from magnetizable material, said field tube having formed in its periphery a plurality of equi-angularly spaced apertures, and a spider formed from magnetizable material located within the field tube, said spider having legs which terminate in pole heads situated respectively within the apertures of the field tube.

A dynamoelectric machine employing such a rotor is described in the prior patent specification No. 2,796,542 of Bekey et al. This specification discloses what is commonly known as a brushless alternator and has its output windings and magnetizing windings mounted on the fixed part of the machine. The magnetizing windings are positioned about tubular extensions and lie within the confines of the field tube, on opposite sides of the spider respectively.

The prior patent specification referred to discloses a rotor in which the field tube is mounted relative to the spider by non-magnetic shaped inserts which are positioned in the apertures of the field tube and which engage with the pole heads of the spider. This way of securing the two parts of the rotor together is comparatively difficult to carry out since the inserts must be cast in position whilst the rotor parts are held relative to each other.

It is an object of the present invention to provide an improved way of securing the field tube to the spider.

Figure 1:
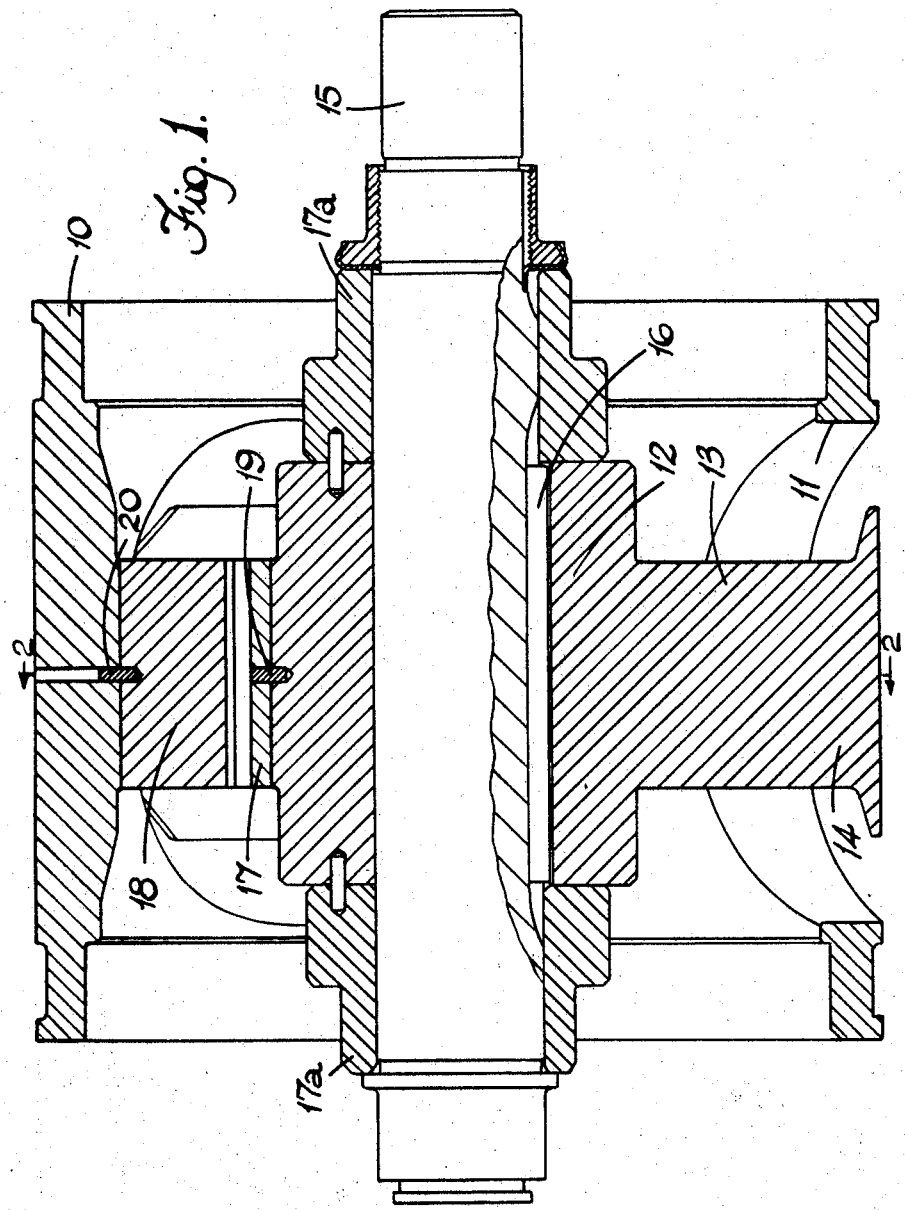
Figure 2:
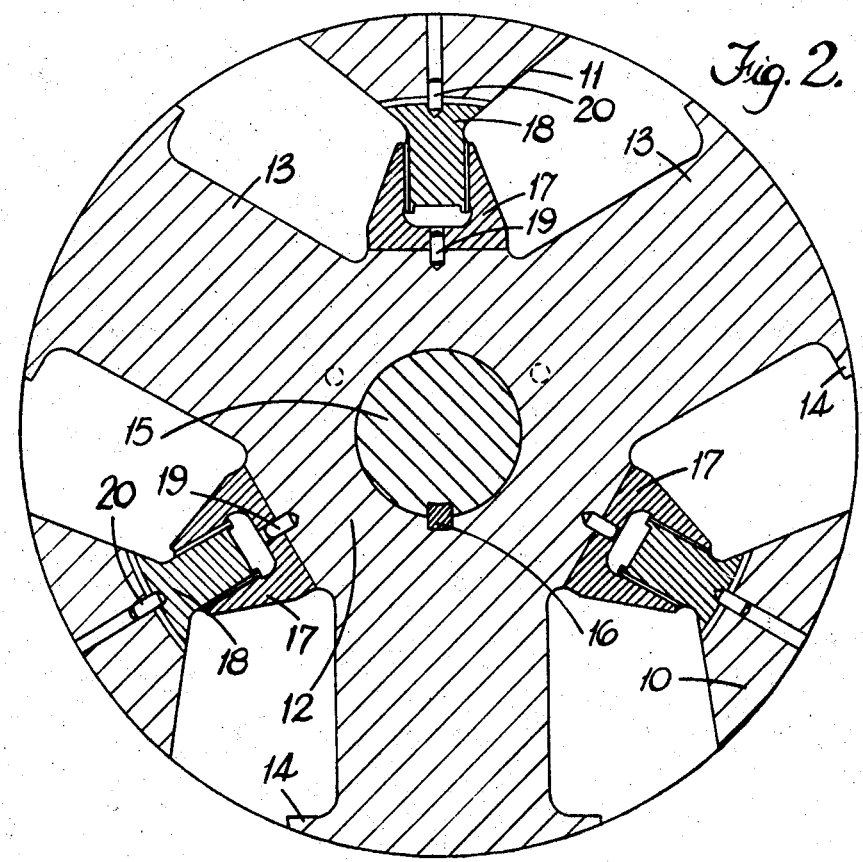

In the accompanying drawing:
FIGURE 1 is a sectional side view of a rotor constructed in accordance with the invention,
FIGURE 2 is a section on the line 2—2 of FIGURE 1.

Referring to the drawings there is provided a cylindrical field tube 10 in which are formed equi-angularly spaced apertures 11. The field tube is mounted on a spider which includes a boss 12 and a plurality of radially extending legs 13. The tips of the legs are shaped to define pole heads 14 which lie within the apertures 11 but which are spaced from the edges thereof.

The boss of the spider is mounted on a shaft 15 to which it is keyed, to prevent relative angular movement, by a key 16. The boss is axially located by a pair of bushes 17a mounted at opposite ends of the boss and which bear upon a flange on the shaft and a nut engaged with the shaft respectively.

The tube is mounted on the boss of the spider by distance pieces disposed intermediate the legs 13 of the spider. Each distance piece comprises a channel shaped member 17 which is provided with a flat exterior base surface which, when the distance piece is in position, co-operates with a complementarily shaped surface disposed intermediate a pair of legs, and a member 18 having a form such that it can slide within the channel of the member 17 and having a surface for co-operation with the internal periphery of the tube.

Owing to the shape of the field tube and spider the assembly thereof has to take place in sequence. Firstly locating pieces in the form of dowel pins 19 are inserted in the holes in bores respectively formed in the hub at positions intermediate the legs. Secondly the spider is located within the field tube and the members 17 engaged with the dowel pins 19 respectively with the side walls of the channels extending in an axial direction. The spider is then positioned within the tube and the members 18 are then engaged within the channels of the members 17 by an axial movement. Further dowel pins 20 are then inserted, through suitable bores formed in the field tube, to locate the members 18.

With the rotor in this partly assembled condition the field tube and spider are then accurately located relative to each other and the co-acting faces of the field tube, the members 17 and 18 and the boss are electron beam welded to form a unitary structure which after being machined to remove surplus metal deposited as a result of the welding operation is mounted upon the shaft 15.

Having thus described my invention what I claim as new and desire to secure by Letters Patent is:

1. A rotor for a dynamoelectric machine and comprising a cylindrical field tube formed from magnetizable material, a plurality of apertures formed in the field tube at equi-angularly spaced positions about the axis thereof, a spider having a boss formed from magnetizable material and having a plurality of legs extending from the boss equal in number to the number of apertures in the field tube, a plurality of pole heads formed at the ends of the legs respectively, the spider being positioned within the field tube with the pole heads situated within the apertures of the field tube and a plurality of two part distance pieces extending radially between the boss and the field tube at positions intermediate the legs respectively, the co-operating surfaces of the tube, the distance pieces and the boss being electron beam welded to produce a unitary structure.

2. A rotor according to claim 1 in which the distance pieces comprise a first member of channel section and having an exterior base surface shaped to co-operate with a surface on the boss of the rotor, and a second member slidable within the channel and having a surface shaped to co-operate with the internal periphery of the tube.

References Cited
UNITED STATES PATENTS
3,229,136  1/1966  Pannell _____ 310—265

J. D. MILLER, *Primary Examiner.*
L. L. SMITH, *Assistant Examiner.*

U.S. Cl. X.R.
310—263